(12) United States Patent
Strawn

(10) Patent No.: US 7,248,867 B2
(45) Date of Patent: Jul. 24, 2007

(54) LOCKING/UNLOCKING A PORTABLE ELECTRONIC DEVICE

(75) Inventor: Andrew Strawn, Hampshire (GB)

(73) Assignee: Nokia Corporation, Espoo (FI)

( * ) Notice: Subject to any disclaimer, the term of this patent is extended or adjusted under 35 U.S.C. 154(b) by 124 days.

(21) Appl. No.: 10/952,898

(22) Filed: Sep. 28, 2004

(65) Prior Publication Data

US 2006/0084424 A1    Apr. 20, 2006

(51) Int. Cl.
*H04Q 7/20*    (2006.01)
(52) U.S. Cl. ............... 455/423; 455/411; 341/26
(58) Field of Classification Search ........ 455/411, 455/566, 565; 700/94; 710/1; 341/22, 26; 348/14.02, 14.03; 379/93.17
See application file for complete search history.

(56) References Cited

U.S. PATENT DOCUMENTS

| | | | | |
|---|---|---|---|---|
| 5,241,583 A | | 8/1993 | Martensson | 455/565 |
| 5,798,716 A | * | 8/1998 | Davis | 341/26 |
| 6,122,530 A | * | 9/2000 | Overy et al. | 455/566 |
| 6,281,925 B1 | * | 8/2001 | Kosaka | 348/14.02 |
| 7,058,391 B2 | * | 6/2006 | Tani | 455/411 |
| 2004/0203604 A1 | * | 10/2004 | Pugliese | 455/411 |
| 2004/0205257 A1 | * | 10/2004 | Hughes et al. | 710/1 |
| 2004/0207722 A1 | * | 10/2004 | Koyama et al. | 348/14.02 |
| 2004/0263360 A1 | * | 12/2004 | Husak | 341/22 |
| 2005/0004692 A1 | * | 1/2005 | Sutton et al. | 700/94 |

* cited by examiner

*Primary Examiner*—Joseph Feild
*Assistant Examiner*—Michael Vu
(74) *Attorney, Agent, or Firm*—Harrington & Smith, PC

(57) ABSTRACT

A portable electronic device operable in a first mode and a second mode, comprising: input means having a first key and a second key, wherein, when the device is in the first mode, the device is not responsive to the individual actuation of the first key and, when the device is in the second mode, the device is responsive to the individual actuation of the first key; and disabling means, responsive when the device is in the first mode to the sequential actuation of the first key then the second key to at least partially disable the input means.

25 Claims, 5 Drawing Sheets

LOCKING/UNLOCKING A PORTABLE ELECTRONIC DEVICE

FIELD OF THE INVENTION

Embodiments of the present invention relate to the locking/unlocking of a portable electronic device. In particular, they relate to the partial disablement of an input means of a portable electronic device.

BACKGROUND TO THE INVENTION

At the present time, many portable electronic devices, and in particular cellular telephones, incorporate a feature which allows the user to disable the keypad of the device. U.S. Pat. No. 5,241,583 describes a method which may be used to disable the keypad of a cellular telephone. In U.S. Pat. No. 5,241,583, the keypad of a cellular telephone is disabled by pressing a sequence of keys or pressing two keys at the same time. Another known way of disabling a keypad is by holding down a particular key in the keypad for a certain duration of time. Once the keypad has been disabled, it is usually re-enabled by pressing the same sequence of keys or the same key that was pressed to lock the device.

Disabling the keypad is useful to the user of the device, as it allows the inadvertent pressing of buttons to be avoided, for instance when the device is in the user's pocket.

However, currently a cellular telephone may only be disabled from the idle/data entry mode. If the user is editing text or watching a video clip on his telephone, he is also unable to disable the keypad at that point. This may be problematic if the user, for instance, writes part of an SMS message, but is distracted and has to put the telephone back into his pocket. At this point, keys may inadvertently be pressed. The user may also wish to let his child watch a video clip on the telephone. The child, however, may try to press some of the buttons on the keypad while the telephone is in the child's possession, which could lead to some of the settings on the telephone being altered and/or important data being lost.

It would be desirable to provide a mechanism for locking the keypad of a portable electronic device when the device is not in its idle/data entry mode.

BRIEF DESCRIPTION OF THE INVENTION

According to one embodiment of the invention, there is provided a portable electronic device operable in a first mode and a second mode, comprising: input means having a first key and a second key, wherein, when the device is in the first mode, the device is not responsive to the individual actuation of the first key and, when the device is in the second mode, the device is responsive to the individual actuation of the first key; and disabling means, responsive when the device is in the first mode to the sequential actuation of the first key then the second key to at least partially disable the input means.

The first mode may be an image display mode. The second mode may be a data entry mode, such as an idle mode in which alphanumeric characters may be input.

The disabling means may, when the device is in first mode, only be responsive to the sequential actuation of the first key then the second key. The disabling means may only be responsive when the second key is actuated within a predetermined time following actuation of the first key.

When the device is in the second mode, the device may be responsive to the individual actuation of the second key.

When the device is in the first mode, the device may be responsive to individual actuation of the second key.

The portable device may further comprise display means for indicating the function of the second key. When the device is in the first mode, the display means may display a legend indicative of the function of the second key in the first mode. When the device is in the first mode, actuation of the first key may cause the display means to display a legend indicating that actuation of the second key will activate the disabling means.

The disabling means may have an activated state during which the input means are at least partially disabled and a deactivated state during which the input means are not disabled, wherein, when the device is in the first mode and the disabling means is in an activated state, the disabling means may enter the deactivated state following actuation of the first key and then the second key. The disabling means may only enter the deactivated state following actuation of the first key and then the second key. When the disabling means is in an activated state, actuation of the first key may cause the display means to display a legend indicating that actuation of the second key will cause the disabling means to enter a deactivated state.

According to another embodiment of the invention, there is provided a portable electronic device operable in a first mode and a second mode, comprising: input means having a first key and a second key, wherein, when the device is in the first mode, the device is not responsive to the individual actuation of the first key and, when the device is in the second mode, the device is responsive to the individual actuation of the first key; and disabling means having an activated state during which the input means are at least partially disabled and a deactivated state during which the input means are not disabled, wherein, when the device is in the first mode, the disabling means enters the deactivated state following actuation of the first key and then the second key.

The disabling means may only enter the deactivated state following actuation of the first key and then the second key.

According to another embodiment of the invention, there is provided a method for locking and unlocking the input means of a portable electronic device operable in a first mode in which the device is not responsive to the individual actuation of a first key of the input means and operable in a second mode in which the device is responsive to the individual actuation of the first key, comprising, when the device is in the first mode, actuating the first key and then a second key of the input means to at least partially disable the input means; and actuating the first key and then the second key of the input means to deactivate the disabling means.

According to another embodiment of the invention, there is provided a portable electronic device operable in a first mode and a second mode, the device comprising: input means comprising a plurality of keys, wherein, when the device is in the first mode, the device is responsive to a first input key sequence to at least partially disable the input means and, when the device is in the second mode, the device is responsive to a second, different, input key sequence to at least partially disable the input means.

The first key input sequence may comprise the sequential actuation of a first key then a second key. The second key input sequence may comprise the sequential actuation of the second key and then the first key.

According to another embodiment of the invention, there is provided a portable electronic device, comprising: input means having a first key and a second key, wherein the second key is a programmable key; display means for displaying a legend indicative of the function of the second key; and disabling means for at least partially disabling the input means including disabling the second key, wherein the disabling means is responsive to actuation of the first key and then the second key.

The second, programmable key may have a different function depending on the mode of the device. The device may have a first mode and a second mode and there may not be a function in the first mode associated with the individual actuation of the first key.

The disabling means may have an activated state during which the input means are at least partially disabled and the disabling means may enter the activated state in response to the actuation of the first key and then the second key. The disabling means may have a deactivated state during which the input means are not disabled and the disabling means may enter the deactivated state in response to actuation of the first key and then the second key.

BRIEF DESCRIPTION OF THE DRAWINGS

For a better understanding of the present invention, reference will now be made by way of example only to the accompanying drawings in which.

DETAILED DESCRIPTION OF EMBODIMENTS OF THE INVENTION

Figure 1:
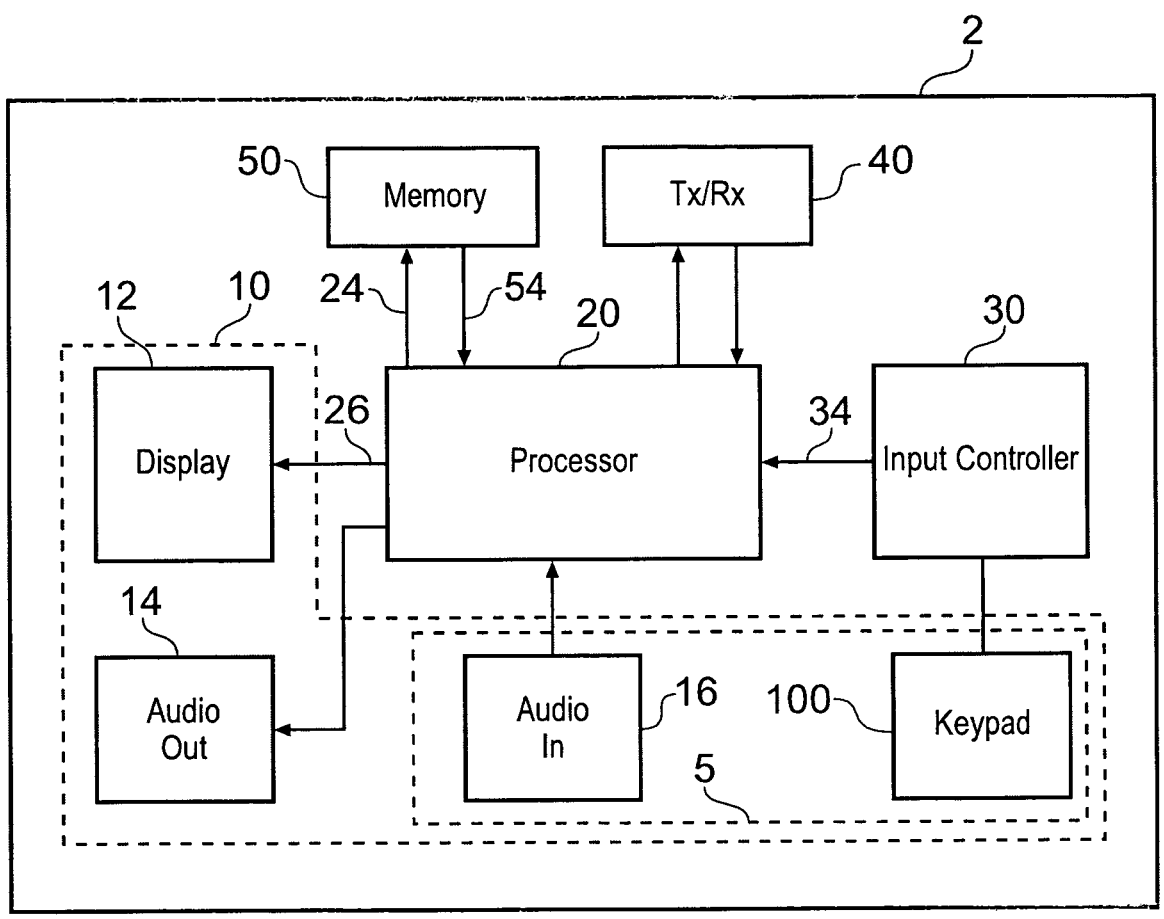
FIG. 1 is a schematic illustration of a portable electronic device.

The figures illustrate a portable electronic device 2 operable in a first mode and a second mode, comprising: input means 5 having a first key 131 and a second key 123, wherein, when the device 2 is in the first mode, the device 2 is not responsive to the individual actuation of the first key 131 and, when the device 2 is in the second mode, the device 2 is responsive to the individual actuation of the first key 131; and disabling means 20, 50, responsive when the device 2 is in the first mode to the sequential actuation of the first key 131 then the second key 123 to at least partially disable the input means 5.

FIG. 1 is a schematic illustration of a portable electronic device 2, which in this example is a hand portable cellular telephone. The cellular telephone comprises a user interface 10, a processor 20, an input controller 30, a radio frequency transceiver 40 and a memory 50. The memory 50 may be part of the processor 20, or it may be external to the processor 20, and linked, for example, to the processor 20 via a bus. The processor 20 is bi-directionally connected to receive an input and provide an output to the user interface 10, the radio frequency transceiver 40 and the memory 50. The user interface 10 comprises a display 12, an audio output 14, an audio input 16 and a keypad 100. The audio input 16 and/or the keypad 100 are operable as an input means 5. The keypad 100 is connected to the input controller 30 which is in turn connected to the processor 20. The keypad 100 comprises a number of function keys 120 and a number of data input keys 130 for inputting alphanumeric characters, as illustrated in FIG. 2.

Figure 2:
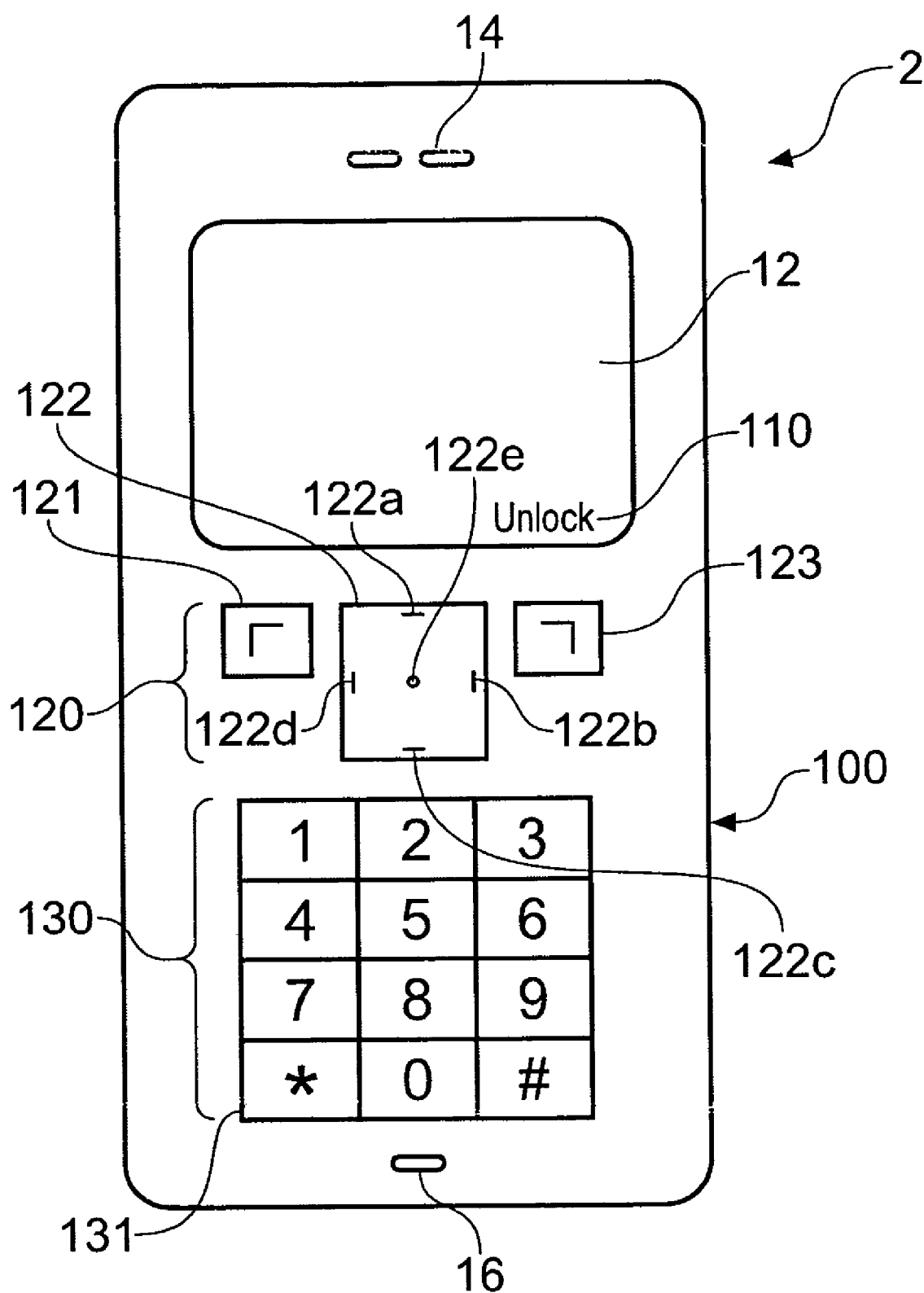
FIG. 2 illustrates the exterior of a portable electronic device.

FIG. 2 illustrates a portable electronic device which in this example is a hand portable mobile cellular telephone 2. The cellular telephone 2 has three function keys 120. The function keys 121 and 123 are sometimes known as "soft keys". The function of soft keys 121 and 123 is indicated by respective legends on the display 12. The legend 110, illustrated in FIG. 2, indicates the operation that will be carried out following actuation of the right soft key 123.

Function key 122 is a scroll key. The upper portion 122a, right portion 122b, lower portion 122c and left portion 122d of the scroll key 122 are typically used to scroll through options within a particular level of the menu system of the cellular telephone 2. The scroll key 122 may provide four-way directional control within a level of the menu system. The Soft keys 121 and 123 and the central portion 122e of the scroll key 122 are used to select options within the menu system and to navigate between levels of the menu system. The cellular telephone 2 also comprises data entry keys 130. When the phone is in its idle/data entry mode, the data entry keys 130 are can be used to enter numbers into the cellular telephone 2. The data entry keys 130 may also be used to enter numbers and/or text when the user accesses a text composition application from the menu system, such as when the user types an SMS message.

Figure 3:
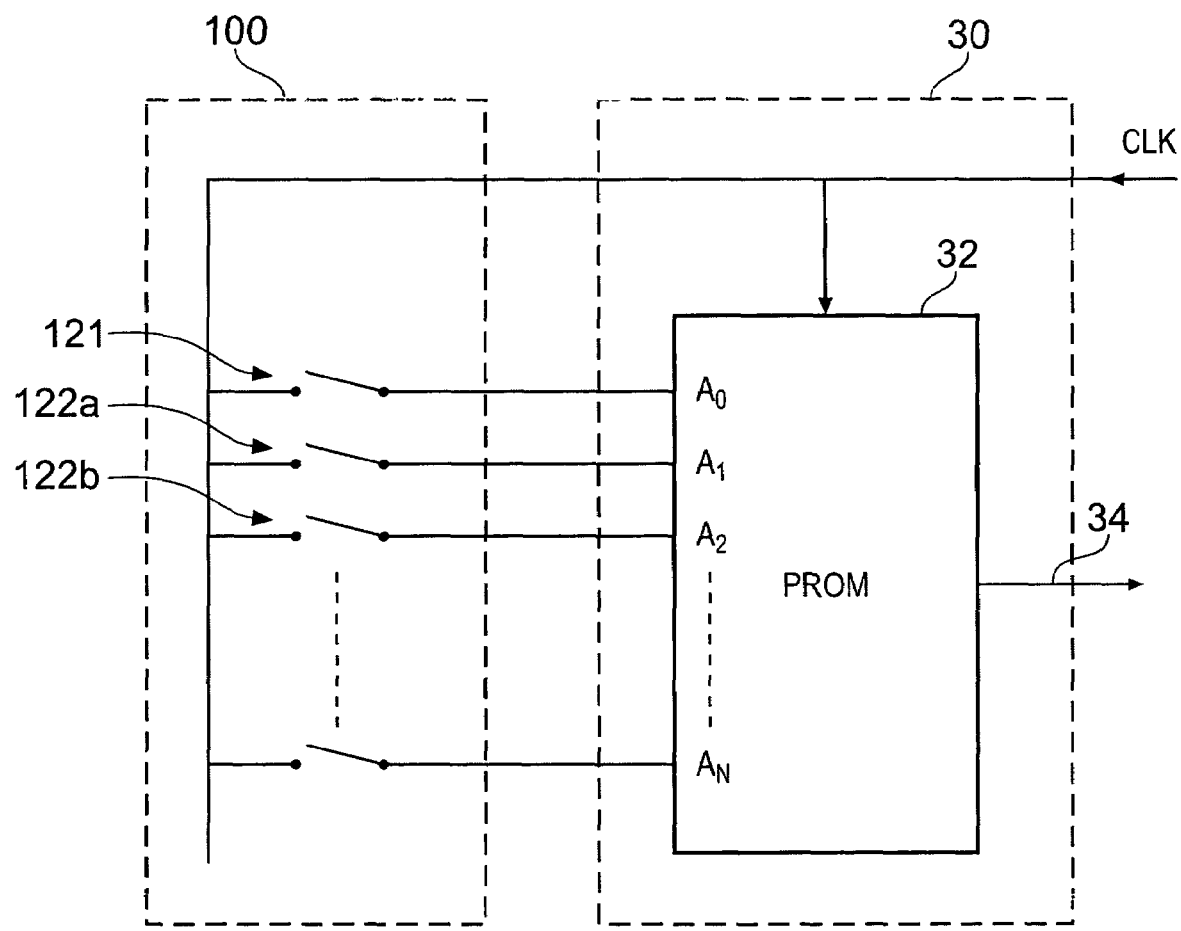
FIG. 3 illustrates circuitry which converts the input from the keys of the portable electronic device into a signal sent to the processor.

FIG. 3 illustrates the operation of the function keys 120 and the data input keys 130 that form the keypad 100. The function keys 120 and data entry keys 130 are for tactile actuation by a user. The user may actuate the keys directly with his fingers. Each key has an underlying switch which in a steady state is open. The actuation of a key by the user closes the switch. The input of each of the switches is connected to a clock signal CLK. The output of each switch provides a bit of an address to a programmed read-only memory (PROM) 32. When a switch is in the open, non-actuated position, it provides a logic LOW value as the address bit. When the switch is closed, it provides a logic HIGH value as the address bit with each clock pulse. The PROM 32 produces an output 34 depending on which of the switches are actuated.

The function keys comprise a left soft key 121, a scroll key 122 and a right soft key 123. In this example, scroll key 122 can be actuated in five different ways. The upper portion 122a, right portion 122b, lower portion 122c, left portion 122d and central portion 122e of the scroll key 122, may be separately actuated and each portion has an associated individual switch that provides a different bit of the address to the PROM 32. For example, the output of the switch corresponding to the upper portion 122a of the scroll key 122 provides a second bit of an address to the PROM 32 and the output of the switch corresponding to the right portion 122b of key 122 provides the third bit of an address to the PROM 32. The output of the switch corresponding to left soft key 121 provides the first bit of the address to the PROM 32. There is a switch corresponding to each of the portions of the scroll key 122, the soft keys 121 and 123 and the data entry keys 130.

When the cellular telephone 2 is in its data entry/idle mode, the input means 5 may be partially disabled by actuating the right soft key 123 followed by the star key 131. Once the input means 5 has been partially disabled, it may be re-enabled by the actuation of the right soft key 123 then the star key 131.

When the input means 5 are partially disabled, the keypad 100 is said to be "locked" and the telephone 2 does not carry out all of the functions that it usually carries out when the telephone is in idle/data entry mode. For instance, when a key other than the right soft key 123 is actuated, the telephone 2 may not respond at all, may respond with an error sound or may respond to show a message on the display 12 indicating that actuation of the right soft key 123 followed by actuation of the star key 131 will re-enable the input means 5. If the right soft key 123 is actuated, the telephone 2 may respond to show a message on the display 12 indicating that subsequent actuation of the star key 131 will re-enable the input means 5.

If the telephone 2 is configured to respond to voice commands via the audio input 16, when the input means 5 are partially disabled the telephone 2 may not respond to voice commands.

When the input means 5 is partially disabled, if an incoming call is received at the transceiver 40 by the telephone 2, some of the function keys 120 may be operable to allow the user to take the call.

In one embodiment, when the input means 5 is partially disabled, the telephone 2 may be responsive to the actuation of a sequence of keys that correspond to a telephone number for the emergency services, for example 911, so that the emergency services may be called without the user having to re-enable the input means 5 using the right soft key 123 and the star key 131.

The cellular telephone 2 may also be operable to play video clips. The video clips may be streamed from an external source via the radio frequency transceiver 40 or they may be stored in the memory 50. The software used to play the video clips is accessed by the user through the menu system using the function keys 120.

Figure 4:
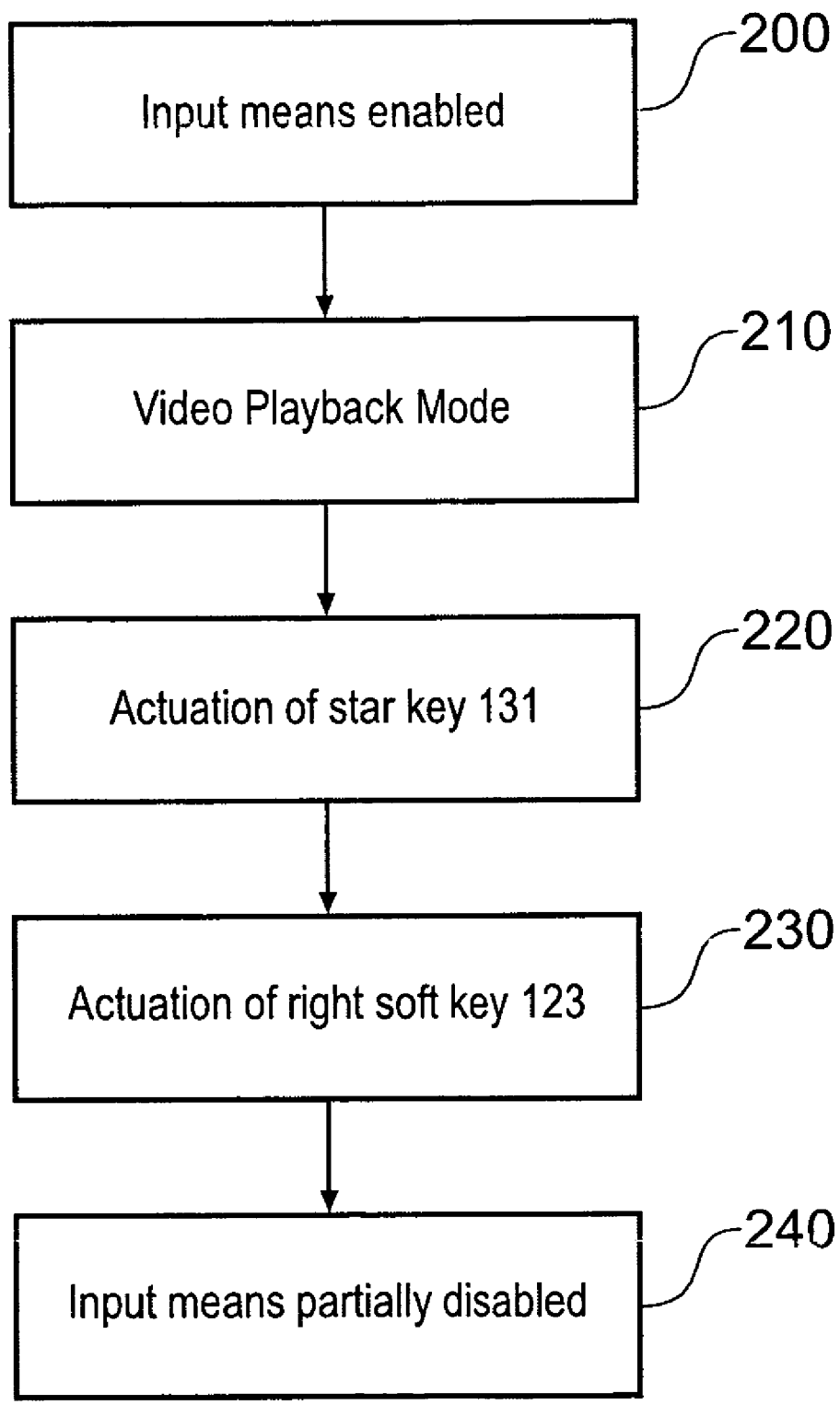
FIG. 4 illustrates a method of partially disabling the input means of a portable electronic device.

Referring to FIG. 4, a method of at least partially disabling the input means 5 of a portable electronic device 2 is shown. The input means 5 of the telephone 2 is partially disabled by sequentially actuating the star key 131 followed by the right soft key 123.

When the input means 5 is to be partially disabled, the processor 20 toggles a flag on in the memory 50 via link 24. Whenever a key is actuated, the processor 20 checks for the presence of the flag in the memory 50 before the processor 20 responds. This will be described in further detail in the forthcoming paragraphs.

In step 200, the input means 5 is enabled. This may be the point at which the device 2 is turned on initially. The user then accesses and navigates the menu system using the function keys 120 to enter video playback mode in step 210. Each time one of the function keys 120 is actuated when the menu system is being accessed and navigated, the processor 20 checks for the presence of the flag in the memory 50. As the input means 5 is enabled, the flag is not present in the memory 50. The function keys 120 therefore perform whatever functions are associated with them in any given level of the menu system.

While the telephone 2 is in video playback mode, the user actuates the star key 131 at step 220. At this point, the input controller 30 sends a signal to the processor 20 via the link 34. The processor again checks for the presence of the flag in the memory 50. As the flag is not present, the processor 20 may then send a signal to the display 12 via link 26. This signal will cause the display 12 to show a message indicating that actuation of the right soft key 123 at this point will partially disable the input means 5. This message may be in the form of legend 110. Alternatively, the telephone 2 may not appear to respond to the user after actuation of the star key 131. The user may be able to choose whether such a message appears on the display 12 following the actuation of the star key 131 using the menu system of the telephone 2.

The user then actuates the right soft key 123 in step 230. Following the actuation of the right soft key 123, the input controller 30 sends a second, different, signal to the processor 20 via link 34. When the processor 20 receives the second signal, it checks for the presence of the flag in the memory 50. The flag is not present in the memory 50. At this point, the processor 20 toggles the flag on in the memory 50 via link 24 to partially disable the input means 5 of the telephone 2. The telephone 2 is then partially disabled at step 240.

If actuation of a key other than the right soft key 123 follows actuation of the star key 131 during partial disablement of the input means 5, the user is required to press the star key 131 again, followed by the right soft key 123 to partially disable the input means 5. In addition, actuation of the right soft key 123 must follow actuation of the star key 131 within a predetermined duration.

When the telephone 2 is in video playback mode and the input means 5 is enabled, there is no video playback function associated with the star key 131. The method of partially disabling the input means 5 described in reference to FIG. 4 is advantageous as a delay in pressing the right soft key 123 or pressing a key other than the right soft key 123 after the star key 131 will have no effect on the video playback.

When the input means 5 are partially disabled, the keypad 100 is said to be "locked". When the keypad 100 is locked, the telephone 2 does not respond to the actuation of the keys of the keypad 100 to carry out functions in the way that it does when the telephone 2 is in video playback mode and the keypad 100 is unlocked. For instance, the left soft key 121 may start and stop playback of the video in video playback mode. However, when the keypad 100 is locked, actuation of the left soft key 121 will not start or stop playback of the video. Furthermore, when the input means 5 are partially disabled, the telephone 2 may not be responsive to voice commands, or input from any attached (via wired or wireless links) external devices.

When the input means 5 is partially disabled and the telephone is in video playback mode, if an incoming call is received at the transceiver 40 by the telephone 2, some of the function keys 120 may be operable to allow the user to take the call. However, if the telephone is in a "silent" mode the incoming call will be logged but no option to answer it will be given.

In one embodiment, when the input means 5 is partially disabled and the telephone 2 is in video playback mode, the telephone 2 may be responsive to the actuation of a sequence of keys that correspond to a telephone number for the emergency services, for example 911, so that the emergency services may be called without the user having to re-enable the input means 5 using the star key 131 and the right soft key 123.

Figure 5:
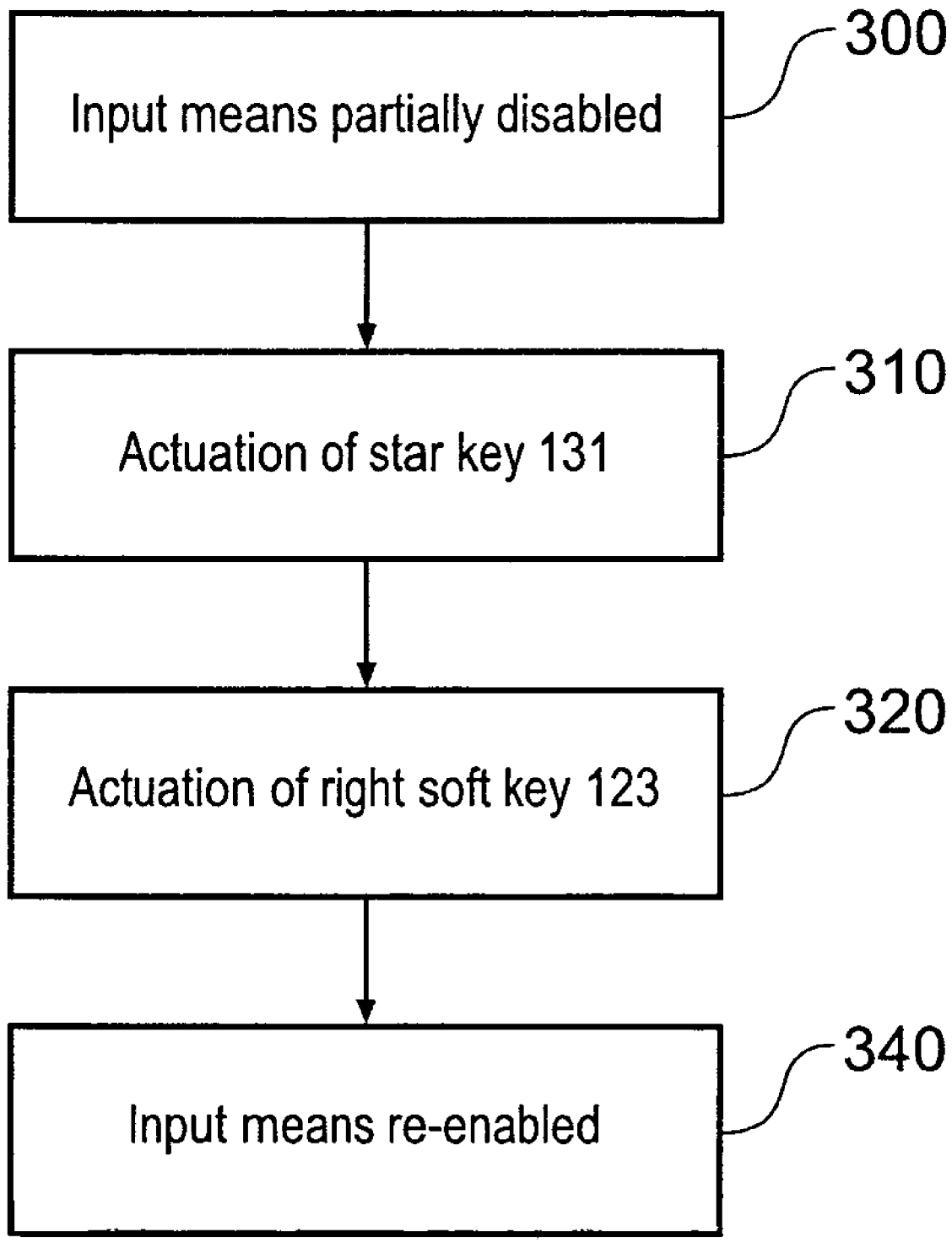
FIG. 5 illustrates a method of re-enabling the input means of a portable electronic device.

FIG. 5 illustrates a method of re-enabling the input means 5 of the portable electronic device 2. The input means 5 of the telephone 2 is re-enabled by sequentially actuating the star key 131 followed by the right soft key 123. At step 300, the input means 5 of the telephone 2 is partially disabled. The flag is therefore present in the memory 50. When the flag is present, the processor 20 may ignore all of the signals from the input controller 30 other than those that correspond to the sequential actuation of the right soft key 123 followed by the star key 131. Alternatively, actuation of one of the keys other than star key 131 may cause the processor 20 to send a signal to the display 12 via link 26. This signal will cause the display 12 to show a message indicating that actuation of the star key 131 followed by the right soft key 123 by the user will re-enable the input means 5.

At step 310, the user actuates the star key 131. The input controller 30 then sends a signal to the processor 20 via link 34. The processor 20 then checks whether the flag is present in the memory 50. As the input means 5 are partially disabled at this point, the flag is present in the memory 50. The processor 20 may then send a signal to the display 12 via link 26 causing the display 12 to show a message indicating to the user that subsequent actuation of the right soft key 123 will re-enable the input means 5 (as shown in FIG. 2). At step 320, the user actuates the right soft key 123. The input controller then sends a second, different, signal to the processor 20 via the link 34. At this point, the processor 20 checks for the presence of the flag in the memory 50. The processor 20 recognises that the flag is present in the memory 50. As actuation of the star key 131 followed by the right soft key 123 re-enables the input means 5, the processor 20 toggles the flag off in the memory 50. The input means 5 is therefore re-enabled.

If actuation of a key other than the right soft key 123 follows actuation of the star key 131 during re-enablement of the input means 5, the user is required to press the star key 131 again, followed by the right soft key 123 to re-enable the input means 5. In addition, actuation of the right soft key 123 must follow actuation of the star key 131 within a predetermined duration.

The method of actuating the star key 131 then the right soft key 123 to lock/unlock the telephone when it is in video playback mode is intuitive to the user as it is the reverse key sequence used to lock/unlock the telephone 2 when it is in idle/data entry mode.

Although embodiments of the present invention have been described in the preceding paragraphs with reference to various examples, it should be appreciated that modifications to the examples given can be made without departing from the scope of the invention as claimed. For example, although a PROM 32 was used in FIG. 2 to translate the actuation of the keys into control signals, other means exist for carrying out the same purpose. For instance, discreet logical elements, programmable logic devices or a programmed microcontroller could be used. In fact, the processor 20, itself, could carry out the process using software stored in the memory 50.

An example has been described in which the input means 5 of a portable electronic device 2 could be partially disabled while the device 2 is in video playback mode. However, embodiments of the invention could be utilised to partially disable the input means 5 while the device 2 is in other modes. For instance, the device 2 could be in audio playback mode or text entry mode (such as in SMS or email messaging), or even part way through the menu system.

The keys 120 and 130 shown in FIG. 2 and FIG. 3 are depressable buttons for tactile actuation by the user. However, the present invention is not limited to this embodiment. Alternatively, the keys may be sensors that are responsive to pressure or changes in the amount of light transmitted/received at the key. The keys may also be formed by a portion of an area of a touch screen display. Touch screen displays may be resistive or capacitive or they may employ a surface acoustic wave system or a system that detects fluctuations in the intensity of light being transmitted or received at the screen. In the case of a resistive touch screen, depression of the upper surface may be required to actuate the key. The other touch screen implementations may require that the user needs only to touch the screen to actuate the key.

The keys 120 and 130 may be actuated by a user directly, for example by the user's fingers or thumbs. The keys may also be actuated using a device. An example of a device for actuating keys is a plastic pen for use with a touch screen display. The pen may be stored within the cellular telephone 2.

In the embodiments of the invention described earlier, the processor 20 continues to receive input information via link 34 when the input means 5 is partially disabled. Instead, the processor 20 may send a signal to the input controller 30 to stop the signals being received from the input controller 30.

I claim:

1. A portable electronic device operable in a first mode and a second mode, comprising: input means having a first key and a second key, wherein, when the device is in the first mode, the device is not operable to perform a function associated with the first mode in response to the actuation of the first key when not followed by actuation of the second key and, when the device is in the second mode, the device is operable to perform a function associated with the second mode in response to the actuation of the first key when not followed by actuation of the second key; and disabling means operable to have a first state when the device is in the first mode and when the device is in the second mode and operable to have a second state when the device is in the first mode and when the device is in the second mode and responsive when the device is in the first mode and in the second state to the sequential actuation of the first key followed by actuation of the second key to enter the first state, wherein in the first state, the sequential actuation of the first key followed by the second key at least partially-disable the input means.

2. A portable electronic device as claimed in claim 1, wherein, when the device is in the first mode, the disabling means is responsive to the actuation of the first key followed by actuation of the second key, and is not responsive to the actuation of any other key or combination of keys.

3. A portable electronic device as claimed in claim 1, wherein the disabling means is responsive when the second key is actuated within a predetermined time following actuation of the first key, and is not responsive when the second key is actuated after the predetermined time following the actuation of the first key.

4. A portable electronic device as claimed in claim 1, wherein when the device is in the second mode, the device is operable to perform a function in response to the actuation of the second key.

5. A portable electronic device as claimed in claim 1, wherein when the device is in the first mode, the device is operable to perform a function in response to the actuation of the second key.

6. A portable electronic device as claimed in claim 1, wherein the portable device further comprises a display for indicating the function to be performed by the device in response to actuation of the second key.

7. A portable electronic device as claimed in claim 6, wherein, when the device is in the first mode, the display displays a legend indicative of the function to be performed by the device in response to the actuation of the second key in the first mode.

8. A portable electronic device as claimed in claim 7, wherein when the device is in the first mode, actuation of the first key causes the display means to display a legend indicating that actuation of the second key will activate the disabling means to further disable the input means.

9. A portable electronic device as claimed in claim 1, wherein the disabling means has a first activated state and a second state, and wherein the input means are further disabled when the disabling means is in the second state than when the disabling means is in the first state, and, when the device is in the first mode and the disabling means is in a second state, the disabling means enters the first state following actuation of the first key and then the second key.

10. A portable electronic device as claimed in claim 9, wherein the disabling means enters the first state following actuation of the first key and then the second key and does not enter the first state following the actuation of any other key or combination of keys.

11. A portable electronic device as claimed in claim 9, wherein the portable device further comprises a display for indicating the function of the second key, wherein when the disabling means is in the second state, actuation of the first key causes the display to display a legend indicating that actuation of the second key will cause the disabling means to enter the first state.

12. A portable electronic device as claimed in claim 1, wherein the first mode is an image display mode.

13. A portable electronic device as claimed in claim 1, wherein the second mode is a data entry mode.

14. A portable electronic device as claimed in claim 1, wherein when the input means is further disabled, the device is operable to carry out fewer functions than when the input means is not further disabled.

15. A portable electronic device as claimed in claim 1, wherein the further disablement of the input means includes at least partial disablement of the second key, so that in the first mode the device is not operable to perform a function associated with the second mode in response to the actuation of the second key.

16. A portable electronic device as claimed in claim 1, wherein the input means further comprises a third key and the further disablement of the input means includes at least partial disablement of the third key, so that in the first mode the device is not operable to perform a function associated with the second mode in response to the actuation of the third key.

17. A portable electronic device operable in a first mode and a second mode, comprising: input means having a first key and a second key, wherein, when the device is in the first mode, the device is not operable to perform a function associated with the first mode in response to the actuation of the first key when not followed by actuation of the second key and, when the device is in the second mode, the device is operable to perform a function associated with the second mode in response to the individual actuation of the first key when not followed by actuation of the second key; and disabling means operable to have a first state when the device is in the first mode and when the device is in the second mode and operable to have a second state when the device is in the first mode and when the device is in the second mode, wherein the input means are at least partially disabled when the disabling means is in the second state than when the disabling means is in the first state, and, when the device is in the first mode and the disabling means is in a second state, the disabling means enters the first state following actuation of the first key and then the second key.

18. A portable electronic device as claimed in claim 17, wherein the disabling means enters the first state in response to the actuation of the first key followed by the second key and does not enter the first state following the actuation of any other key or combination of keys.

19. A method for locking and unlocking input means of a portable electronic device operable in a first mode in which the device is not operable to perform a function associated with the first mode in response to the actuation of a first key of the input means when not followed by the actuation of a second key of the input means and operable in a second mode in which the device is operable to perform a function associated with the second mode in response to the actuation of the first key when not followed by the actuation of the second key, comprising, when the device is in the first mode, actuating the first key and then a second key of the input means to further disable the input means through disabling means; and then actuating the first key and then the second key of the input means to remove the further disablement, wherein the disabling means is operable to have a first state when the device is in the first mode and when the device is in the second mode and operable to have a second state when the device is in the first mode and when the device is in the second mode, wherein the input means are at least partially disabled when the disabling means is in the second state.

20. A portable electronic device operable in a first mode in which the device is not operable to perform a function associated with the first mode in response to the actuation of a first key of the input means when not followed by the actuation of a second key of the input means and operable in a second mode in which the device is operable to perform a function associated with the second mode in response to the actuation of the first key when not followed by the actuation of the second key, comprising: input means having the first key and the second key, wherein the second key is a programmable key; a display for displaying a legend indicative of the function of the second key; and disabling means, responsive to actuation of the first key followed by actuation of the second key for at least partially disabling the input means including disabling the second key, wherein the disabling means has an activated state during which the input means are at least partially disabled and the disabling means enters the activated state in response to the actuation of the first key and then the second key, wherein the disabling means has a deactivated state during which the input means are not disabled and disabling means enters the deactivated state in response to actuation of the first key and then the second key.

21. A portable electronic device as claimed in claim 20, wherein the second, programmable key has a different function depending on the mode of the device.

22. A portable electronic device as claimed in claim 20, wherein the device has a first mode and a second mode and there is no function in the first mode associated with the individual actuation of the first key.

23. A portable electronic device operable in a first mode and a second mode, comprising: an input device having a first key and a second key; and a processor operable, when the device is in a first mode, to perform a first function in response to input from the input device, and operable, when the device is in a second mode, to perform at least one other function in response to the actuation of the first key, but not operable to perform the first function, the at least one other function being different to the first function, wherein the processor is operable, when the device is in the first mode, to at least partially disable the first mode in response to the actuation of the first key followed by actuation of the second key, so that the processor is not operable to perform the first function in response to input from the input device, wherein the processor in disabling is operable to have a first state when the device is in the first mode and when the device is in the second mode and operable to have a second state when the device is in the first mode and when the device is in the second mode, wherein the input device is at least partialy disabled in the second state.

24. A portable electronic device as claimed in claim 23, wherein when the first mode is not at least partially disabled, the processor is operable to perform the first function in response to actuation of the second key, and when the first mode is at least partially disabled, the processor is not operable to perform the first function in response to actuation of the second key.

25. A portable electronic device as claimed in claim 23, wherein the input device further comprises a third key, and when the first mode is not at least partially disabled, the processor if operable to perform the first function in response to actuation of the third key, and when the first mode is at least partially disabled, the processor is not operable to perform the first function in response to actuation of the third key.

* * * * *